United States Patent
Brown et al.

(10) Patent No.: US 6,777,509 B2
(45) Date of Patent: Aug. 17, 2004

(54) SOLUTION POLYMERIZATION PROCESS

(75) Inventors: Stephen John Brown, Calgary (CA);
John William Swabey, Calgary (CA);
Christopher John Brooke Dobbin, Calgary (CA)

(73) Assignee: Nova Chemicals (International) S.A (CH)

( * ) Notice: Subject to any disclaimer, the term of this patent is extended or adjusted under 35 U.S.C. 154(b) by 35 days.

(21) Appl. No.: 10/124,465

(22) Filed: Apr. 17, 2002

(65) Prior Publication Data

US 2003/0004288 A1 Jan. 2, 2003

(30) Foreign Application Priority Data

May 11, 2001 (CA) ............................................ 2347410

(51) Int. Cl.$^7$ ................................................. C08F 4/52
(52) U.S. Cl. ...................... 526/161; 526/172; 526/170; 526/160; 526/131; 526/134; 526/153
(58) Field of Search ................................ 526/134, 161, 526/172, 348.2

(56) References Cited

U.S. PATENT DOCUMENTS

| | | | |
|---|---|---|---|
| 4,530,914 A | 7/1985 | Ewen et al. ................. 502/113 |
| 4,659,685 A | 4/1987 | Coleman, III et al. ...... 502/113 |
| 4,701,432 A | 10/1987 | Welborn, Jr. ................. 502/113 |
| 5,132,380 A | 7/1992 | Stevens et al. ............. 526/126 |
| 5,145,818 A | 9/1992 | Tsutsui et al. ............. 502/113 |
| 5,198,401 A | 3/1993 | Turner et al. ............. 502/155 |
| 5,395,810 A | 3/1995 | Shamshoum et al. ....... 502/113 |
| 5,589,555 A | 12/1996 | Zboril et al. ................. 526/64 |
| 5,594,078 A | 1/1997 | Welch et al. ............... 526/119 |
| 5,614,456 A | 3/1997 | Mink et al. ................. 502/115 |
| 5,648,428 A | 7/1997 | Reddy et al. ................ 526/116 |
| 5,767,031 A | 6/1998 | Shamshoum et al. ....... 502/104 |
| 6,234,950 B1 * | 5/2001 | von Haken Spence et al. .. 506/155 |
| 6,277,931 B1 * | 8/2001 | Jaber et al. .................... 526/65 |
| 6,355,744 B1 * | 3/2002 | von Haken Spence et al. ............................ 526/127 |
| 6,372,864 B1 * | 4/2002 | Brown ........................ 526/65 |
| 6,440,890 B1 * | 8/2002 | von Haken Spence et al. ............................ 502/155 |
| 6,476,245 B1 * | 11/2002 | Cavell et al. .................. 556/9 |
| 6,486,276 B1 * | 11/2002 | Wang et al. ................. 526/133 |
| 2003/0004288 A1 * | 1/2003 | Brown et al. ................ 526/134 |

FOREIGN PATENT DOCUMENTS

CA 2245375 2/2000

* cited by examiner

Primary Examiner—David W. Wu
Assistant Examiner—Rip A Lee
(74) Attorney, Agent, or Firm—Kenneth H. Johnson

(57) ABSTRACT

A solution polymerization process using a phosphinimine catalyst and a boron activator is conducted at a temperature of about 170° C. or greater in the presence of trialkyl aluminum to produce polyethylene having a comparatively broad molecular weight distribution. The polyethylene product produced by the process of this invention is desirable because it can provide enhanced "processability" in comparison to polyethylene having a narrow molecular weight distribution. The process of this invention is advantageous in comparison to prior art processes for the preparation of "broad" polyethylene which use two polymerization reactors and/or more than one polymerization catalyst. The polymers produced by the process of this invention are potentially suitable for the preparation of plastic film. For example, a polyethylene according to this invention and having a density of about 0.93 grams per cubic centimeter and a melt index $I_2$ (according to ASTM D 1238) of about 2 may be advantageously used to prepare cast film. In addition the present polyethylenes may be used for the manufacture of a wide variety of other goods including blow molded parts (such as tanks, drums and containers for gasoline or other liquids); extruded goods (such as profiles or hoses); and injection molded goods such as food containers.

9 Claims, No Drawings

SOLUTION POLYMERIZATION PROCESS

FIELD OF THE INVENTION

This invention relates to a process for the preparation of polyethylene having a broad molecular weight distribution.

BACKGROUND OF THE INVENTION

It is well known that linear polyethylene may be prepared by the polymerization of ethylene (optionally with one or more olefins or diolefins such as butene, hexene, octene or hexadiene) using a "Ziegler" catalyst system which comprises a transition metal compound (such as a titanium halide) or a vanadium halide and an aluminum alkyl. Polyethylene produced in this manner, particularly "linear low density polyethylene", is in widespread commercial use. However, the conventional linear low density polyethylene ("lldpe") made with Ziegler catalysts suffers from a number of deficiencies. Most notably, conventional lldpe is a heterogeneous product which contains a small fraction of low molecular weight wax and a comparatively large amount of very high molecular weight homopolymer. The heterogeneous nature of these polymers generally detracts from the physical properties of finished goods made from them.

Accordingly, a great deal of effort has been directed towards the preparation of "homogeneous" lldpe resins which mitigate this problem. In particular, it is now well known to those skilled in the art that so-called "metallocene" catalysts may be used to produce homogeneous lldpe resin. These homogeneous resins are, however, not without problems. Most notably, these homogeneous resins typically have a narrow molecular weight distribution and are difficult to "process" or convert into finished polyethylene products. Thus, efforts to improve the processability of homogeneous polyethylene resin by broadening the molecular weight distribution are disclosed in the art.

One approach which has been used to achieve this object is the use of mixed catalyst systems in a single reactor. For example, U.S. Pat. No. 4,530,914 (Ewen et al., to Exxon) teach the preparation of "broad" polymers through the use of two different metallocene catalysts and U.S. Pat. No. 4,701,432 (Welborn, to Exxon) teaches the use of a supported catalyst prepared with a metallocene catalyst and a Ziegler Natta catalyst. Many others have subsequently attempted to use similar mixed catalyst systems, as described in U.S. Pat. Nos. 5,767,031; 5,594,078; 5,648,428; 4,659,685; 5,145,818; 5,395,810; and 5,614,456.

However, the use of "mixed" catalyst systems is generally associated with operability problems. For example, the use of two catalysts on a single support (as taught by Welborn in U.S. Pat. No. 4,701,432) may be associated with a reduced degree of process control flexibility (e.g. if the polymerization reaction is not proceeding as desired when using such a catalyst system, then it is difficult to establish which corrective action should be taken because the corrective action will typically have a different effect on each of the two different catalyst components). Moreover, the two different catalyst/cocatalyst systems may interfere with one another—for example, the organoaluminum component which is often used in Ziegler Natta or chromium catalyst systems may "poison" a metallocene catalyst.

Another alternative is to use two different homogeneous catalysts in two different polymerization reactors. In commonly assigned U.S. Pat. No. 6,063,879 (Stephan et al.) there are disclosed certain phosphinimine catalysts which may be used to produce homogeneous polyethylene. The use of such phosphinimine catalysts in a "dual reactor" polymerization system to prepare polymers having a broad molecular weight distribution is also disclosed in a commonly assigned patent application (Brown et al., U.S. Ser. No. 09/364,703 and corresponding Canadian application 2,245,375).

Each of the approaches to produce broad MWD polymers requires the use of at least two distinct polymerization catalysts or two distinct polymerization reactors.

We have now discovered a process to prepare broad MWD ethylene polymers in a single polymerization reactor using a single phosphinimine catalyst and a specific activation system.

The present process is simpler/more elegant than the above described prior art process in the sense that the present process does not require the use of two catalysts and/or two reactors. The simplicity of the present process offers the potential to improve process control and reduce costs in comparison to the prior art processes.

SUMMARY OF THE INVENTION

A process for preparing thermoplastic ethylene alpha olefin copolymer having a polydispersity (or molecular weight distribution, Mw/Mn) of greater than 2, said process comprising polymerizing ethylene and at least one other $C_3$ to 10 alpha olefin under medium pressure solution polymerization conditions at a temperature of greater than 170° C. to 300° C. in the presence of a catalyst system comprising:

1) an organometallic catalyst comprising a group 4 metal, at least one phosphinimine ligand and at least one activatable ligand;
2) a four coordinate boron activator; and
3) at least one trialkyl aluminum.

DETAILED DESCRIPTION

The catalyst used in this invention is an organometallic complex of a group 4 metal having at least one phosphinimine ligand and at least one activatable ligand. Highly preferred catalysts also contain a cyclopentadienyl ligand.

The preferred phosphinimine catalysts used in this invention are defined by the formula:

$$(Cp)_a M(Pl)_b (L)_c$$

wherein Pl is a phosphinimine ligand (see section 1.1 below); Cp is a cyclopentadienyl-type ligand (section 1.2 below); L is an activatable ligand (section 1.3 below); M is a metal selected from Ti, Hf and Zr; and wherein a is 0 or 1; b is 1 or 2; a+b=2; c is 1 or 2; and a+b+c=the valence of the metal M.

The most preferred catalysts are those in which the metal is 4 valent. For example, a catalyst may be a cyclopentadienyl-phosphinimine complex of titanium, zirconium, or hafnium having two additional, monoanionic ligands. It is particularly preferred that each catalyst contains one phosphinimine ligand, one cyclopentadienyl ligand and two chloride or alkyl ligands.

Each catalyst must contain at least one phosphinimine ligand which is covalently bonded to the metal. Phosphinimine ligands are defined by the formula:

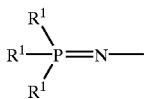

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

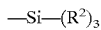

wherein each $R^2$ is independently selected from the group consisting of hydrogen, a $C_{1-8}$ alkyl or alkoxy radical, $C_{6-10}$ aryl or aryloxy radicals, and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)$_3$ wherein each R is independently selected from the group consisting of hydrogen, a $C_{1-8}$ alkyl or alkoxy radical $C_{6-10}$ aryl or aryloxy radicals; germanyl radicals of the formula Ge—(R)$_3$ wherein R is as defined directly above.

The term "activatable ligand" refers to a ligand which may be activated by a cocatalyst, (or "activator"), to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The catalyst metals are group 4 metals, preferably in their highest oxidation state (i.e. 4$^+$) and the preferred activatable ligands are monoanionic (such as a halide—especially chloride or an alkyl—especially methyl). Thus, the preferred catalyst contains a phosphinimine ligand, a cyclopentadienyl ligand and two chloride (or methyl) ligands bonded to the group 4 metal. In some instances, the metal of the catalyst component may not be in the highest oxidation state. For example, a titanium (III) component would contain only one activatable ligand. Also, it is permitted to use a dianionic activatable ligand (such as a butadienyl ligand) although this is not preferred.

The catalyst component described in part 1 above is used in combination with a boron activator to form an active catalyst system for olefin polymerization as described in more detail below.

So-called boron activators (also known as "ionic activators" are well known for use with metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by many of those skilled in the art that boron activators initially cause the abstraction of one or more of the activatable ligands in a manner which ionizes the catalyst into a cation, then provides a bulky, labile, non-coordinating anion which stabilizes the catalyst in a cationic form. The resulting bulky, non-coordinating anion permits olefin polymerization to proceed at the cationic catalyst center (presumably because the non-coordinating anion is sufficiently labile to be displaced by monomer which coordinates to the catalyst. It should be expressly noted that the boron activator/phosphinimine catalyst may also form a non-ionic coordination complex which is catalytically active for olefin polymerization. The boron activator is described as being four coordinate—i.e. there must be four ligands bonded to the boron atom. Preferred boron activators are described in (i)–(ii) below:

(i) compounds of the formula $[R^5]^+[B(R^7)_4]^-$ wherein B is a boron atom, $R^5$ is a aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—(R$^9$)$_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above.

In the above compounds preferably $R^7$ is a pentafluorophenyl radical. In general, preferred boron activators may be described as salts of tetra(perfluorophenyl) boron. More specifically, the preferred activators are anilinium, carbonium, oxonium, phosphonium and sulfonium salts of tetra(perfluorophenyl) boron, with anilinium and trityl (or "triphenyl methylium") salts being especially preferred.

It should also be noted that three coordinate boron activators (i.e. compounds of the formula B(R$^7$)$_3$ where $R^7$ is as defined above) are not suitable for use in the process of this invention. This is surprising as such compounds are well known as activators for metallocene catalysts. However, for reasons which are not completely understood, the use of a trivalent boron activator is not suitable for preparing polymers having a broad molecular distribution in accordance with the process of this invention.

Exemplary ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m, m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators which are suitable for the process of this invention are:
N,N-dimethylaniliniumtetrakispentafluorophenyl borate, and
triphenylmethylium tetrakispentafluorophenyl borate (also known as "trityl borate").

It is preferred to use the boron activator in an equimolar amount with respect to the transition metal of the catalyst (i.e. boron/titanium ratio of 1/1, when the catalyst is an organotitanium complex) through mole ratios of from 0.3/1 to 10.0/1 may be used.

The use of a trialkyl aluminum alkyl is essential to the process of this invention. Preferred amounts are from 1:1 to 100:1 (on a molar basis, with reference to the group 4 metal contained in the phosphinimine catalyst).

Preferred aluminum alkyls are trimethyl aluminum, triethyl aluminum, tri isobutyl aluminum and tri n-butyl aluminum. Mixed aluminum alkyls (i.e. where different alkyl ligands are bonded to the aluminum) and/or mixtures of aluminum alkyls may also be used. However, the aluminum compound must be a trialkyl aluminum. Most notably, for reasons which are not completely understood, the use of an aluminum alkyl/alkoxide (i.e. an organoaluminum having an alkyl ligand and an alkoxy ligand) is not suitable because it does not always lend to polymers having a broadened molecular weight distribution (as is illustrated in the Examples).

The use of alumoxane (also known as aluminoxane) is optional.
The alumoxane may be of the formula:

$(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

Many commercially available alumoxanes are known to contain trialkyl aluminum. Thus, such alumoxanes may be the source of the trialkyl aluminum which is essential to the process of this invention. This is described in more detail in the Examples.

Solution processes for the (co)polymerization of ethylene are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80° C. to about 300° C. (preferably from about 120° C. to 250° C.). However, as is illustrated in the Examples, the polymerization temperature for the process of this invention must be greater than about 160° C. (because at lower polymerization temperature, the resulting polymers generally do not exhibit the broad molecular weight distribution which is a desirable feature of this invention). The upper temperature limit will be influenced by considerations which are well known to those skilled in the art, such as a desire to maximize operating temperature (so as to reduce solution viscosity). While still maintaining good polymer properties (as increased polymerization temperatures generally reduce the molecular weight of the polymer). In general, the upper polymerization temperature will preferably be between 200 and 300° C. (especially 220 to 250° C.). The most preferred reaction process is a "medium pressure process", meaning that the pressure in the reactor is preferably less than about 6,000 psi (about 42,000 kiloPascals or kPa). Preferred pressures are from 10,000 to 40,000 kPa, most preferably from about 2,000 psi to 3,000 psi (about 14,000–22,000 kPa).

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornes, alkenyl-substituted norbornes and the like (e.g. 5-methylene-2-norbornene and 5-ethylidene-2-norbornene, bicyclo-(2,2,1)-hepta-2,5-diene).

The polyethylene polymers which may be prepared in accordance with the present invention are LLDPE's which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present invention may be LLDPE having a density from about 0.910 to 0.935 g/cc or (linear) high density polyethylene having a density above 0.935 g/cc. The present invention might also be useful to prepare polyethylene having a density below 0.910 g/cc—the so-called very low and ultra low density polyethylenes.

Generally the alpha olefin may be present in an amount from about 3 to 30 weight %, preferably from about 4 to 25 weight %.

The present invention may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

The monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components may be premixed in the solvent for the reaction or fed as separate streams to the reactor. In some instances premixing it may be desirable to provide a reaction time for the catalyst components prior to entering the reaction. Such an "in line mixing" technique is described in a number of patents in the name of DuPont Canada Inc (e.g. U.S. Pat. No. 5,589,555 issued Dec. 31, 1996).

EXAMPLES

Continuous Solution Polymerization

All the polymerization experiments described below were conducted on a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activators and methylalumoxane (MAO) in cyclohexane, solutions were prepared in purified xylene. The catalyst precursor used in all experiments was cyclopentadienyl titanium (triteriary butyl phosphinimine) dichloride (or "CpTiNP(tBu$_3$)Cl$_2$"). If MAO was used in the experiments, the catalyst was added directly in the precursor form—(i.e. as CpTiNP(tBu$_3$)Cl$_2$). In the absence of MAO, the catalyst precursor was alkylated (using a Grignard reagent such as methyl magnesium bromide so as to form cyclopentadienyl titanium (tritertiary butyl phosphinimine) dimethyl—or "CpTiNP(tBu$_3$)Me$_2$" prior to adding it to the polymerization reactor). The catalyst was activated with the ionic activator, in situ (in the polymerization reactor) at the reaction temperature in the presence of the monomers. The activator used in the examples was trityl borate (unless otherwise indicated). Catalyst and activator concentrations in the polymerization reactor are shown in the Table (micromolar concentrations). The polymerizations were carried out in cyclohexane at a pressure of 1500 pounds per square inch (psi). Ethylene was supplied to the reactor by a calibrated thermal mass flow meter and was dissolved in the reaction solvent prior to the polymerization reactor. If comonomer (for example 1-octene) was used it was also premixed with the ethylene before entering the polymerization reactor copolymerizations are indicated by the "$C_8$" entry in Table 1 (where $C_8$ represents octene and $C_2$ represents ethylene). Under these conditions the ethylene conversion is a dependent variable controlled by the catalyst concentration, reaction temperature and catalyst activity, etc.

The internal reactor temperature is monitored by a thermocouple in the polymerization medium and can be controlled at the required set point to +/−0.5° C. Downstream of the reactor the pressure was reduced from the reaction pressure (1500 psi) to atmospheric. The solid polymer was then recovered as a slurry in the condensed solvent and was dried by evaporation before analysis.

The ethylene conversion was determined by a dedicated on-line gas chromatograph by reference to propane which was used as an internal standard.

Molecular weight distributions (Mw/Mn) were determined by gel permeation chromatography ("GPC") using a commercially available chromatograph ("Waters 150").

Example 1

Comparative

The comparative experiments of this example show that polymerizations with a phosphinimine catalyst at a temperature of 180° C. do not produce a broad molecular weight distribution in the absence of trialkyl aluminum (see entry 1—Mw/Mn=1.8).

Example 2

Inventive

This experiment illustrates that a polymerization temperature of 200° C. with a phosphinimine catalyst in the presence of trimethyl aluminum provides polyethylene having a desirable molecular weight distribution (mole ratio 10/1, based on the titanium).

Example 3

Comparative

The comparative experiments of this example are similar to those of example 1 except the polymerization temperature was increased to 200° C. These experiments show that high temperature alone (in the absence of aluminum alkyl) is not always sufficient to provide a "broad" MWD polymer.

Example 4

Comparative

Only three of the four necessary conditions for the process of the present invention were employed in the experiments of this example—(namely, 1) the use of the phosphinimine catalyst; 2) the use of boron activator having four ligands; and 3) the presence of free aluminum alkyl). MAO was added to the polymerizations of this example. The MAO contained about 20 mole % free trimethyl aluminum (TMA), based on the total aluminum content of the MAO. The Al/Ti ratios shown in Table 1 are based on the TMA (not total MAO). However, the fourth necessary condition (i.e. a polymerization temperature of 170° C. or greater) was not used—and the polymers produced in these comparative examples have a narrow molecular weight distribution.

Example 5

Comparative

A magnesium alkyl (butyl ethyl magnesium) was added instead of magnesium alkyl (Mg/Ti ratio of 1.5/1). This Mw/Mn result shows that a magnesium alkyl did not broaden the molecular weight distribution of polyethylene produced at 180° C.

Example 6

Comparative

This comparative example used only three of the necessary conditions for the process of the present invention (namely, 1) the use of the phosphinimine catalyst; 2) the use of an appropriate boron activator; and 3) a polymerization temperature of 170° C. or greater). However, the four necessary conditions were not satisfied (because a dialkyl aluminum alkoxide, namely di-isobutyl aluminum (2,6,-ditertiary butyl phenoxide) was employed instead of a trialkyl aluminum. The Al/Ti ratios used in the experiments of this example are noted in Table 1.

Example 7

Inventive

The inventive experiments of this example illustrate the production of polyethylene having a desirable (broad) molecular weight distribution at a polymerization temperature of 200° C. MAO was added to these polymerizations. The MAO contained about 20 mole % trimethyl aluminum (TMA) based on the total aluminum in the MAO. The Al/Ti molar ratio shown in Table 1 includes only the trimethyl aluminum (it does not include the aluminum in the oligomeric MAO).

Example 8

Inventive

This inventive example is similar to example 7 except the polymerization temperature was lowered to 180° C. (Again, MAO containing about 20 mole % TMA was included in these polymerizations and the Al/Ti ratio reflects the amount of TMA.)

Example 9

Inventive

The aluminum alkyl which is required for the process of this invention was tri-isobutyl aluminum (instead of the trimethyl aluminum of examples 7/8).

Example 10

Inventive

Anilinium borate ($Ph_3Me_2NHB(C_6F_5)_4$) was used as the activator in this example instead of the trityl borate used in the previous examples.

Example 11

Comparative

This comparative example is similar to inventive example 7 except that (a bulky alcohol (namely, 2,4 di tertiary butyl phenol) was added to the aluminoxane at a mole ratio of 4/1 (based on the molar concentration of the aluminum in the aluminoxane). Whilst not wishing to be bound by theory, it is postulated that the bulky alcohol reacts with the trimethyl aluminum contained in the aluminoxane). The polymerization reaction was very active but the polymers produced in these comparative experiments have a narrow molecular weight distribution.

Example 12

Inventive

This inventive example is similar to inventive example 7 except that the polymerization temperature of this inventive example was 180° C. (instead of 200° C. for comparative example 4). MAO containing 20 mole % TMA was added to these polymerizations. The Al/Ti ratios reflect the TMA concentration.

TABLE 1

Reactor Concentrations

|  |  | Catalyst | Catalyst (mircoM) | Activator (mircoM) | Conversion (%) | Temp (° C.) | (C8 =)/(C2 =) (wt/wt) | Mw/Mn | Al/Ti (mol/mol) |
|---|---|---|---|---|---|---|---|---|---|
| Example 1-c | 1 | CpTiNP(tBu)$_3$Me$_2$ | 1.55 | 1.55 | 94.2 | 180 | 0.00 | 1.8 | 0 |
|  | 2 | CpTiNP(tBu)$_3$Me$_2$ | 1.16 | 1.16 | 92.7 | 180 | 0.00 | 1.8 | 0 |
|  | 3 | CpTiNP(tBu)$_3$Me$_2$ | 1.16 | 1.16 | 90.1 | 180 | 0.00 | 1.9 | 0 |
|  | 4 | CpTiNP(tBu)$_3$Me$_2$ | 1.16 | 1.16 | 92.7 | 180 | 0.00 | 2.0 | 0 |
| Example 2 | 5 | CpTiNP(tBu)$_3$Cl$_2$ | 37.04 | 37.04 | 83.8 | 200 | 0.63 | 3.6 | 10.0 |
| Example 3-c | 6 | CpTiNP(tBu)$_3$Me$_2$ | 3.47 | 3.47 | 91.6 | 200 | 0.63 | 1.8 | 0 |
|  | 7 | CpTiNP(tBu)$_3$Me$_2$ | 3.94 | 3.94 | 90.8 | 200 | 0.42 | 1.8 | 0 |
|  | 8 | CpTiNP(tBu)$_3$Me$_2$ | 3.01 | 3.01 | 90.4 | 200 | 0.21 | 1.8 | 0 |
|  | 9 | CpTiNP(tBu)$_3$Me$_2$ | 3.01 | 3.01 | 92.0 | 200 | 0.00 | 1.9 | 0 |
|  | 10 | CpTiNP(tBu)$_3$Me$_2$ | 2.31 | 2.31 | 91.3 | 200 | 0.00 | 1.9 | 0 |
| Example 4-c | 11 | (Cp)TiN = P(tBu)$_3$Cl$_2$ | 1.16 | 0.58 | 89.5 | 160 | 89.50 | 1.9 | 2.5 |
|  | 12 | (Cp)TiN = P(tBu)$_3$Cl$_2$ | 1.16 | 1.16 | 91.9 | 160 | 91.89 | 1.7 | 1.1 |
| Example 5-c | 13 | CpTiNP(tBu)$_3$Cl$_2$ | 12.04 | 12.04 | 96.9 | 180 | 0.00 | 1.9 | 0 |
| Example 6-c | 14 | CpTiNP(tBu)$_3$Cl$_2$ | 2.78 | 2.78 | 91.7 | 200 | 0.65 | 1.9 | 40.0 |
|  | 15 | CpTiNP(tBu)$_3$Cl$_2$ | 2.78 | 2.78 | 91.2 | 200 | 0.65 | 1.8 | 20.0 |
|  | 16 | CpTiNP(tBu)$_3$Cl$_2$ | 2.78 | 2.78 | 91.9 | 200 | 0.65 | 1.9 | 80.0 |
| Example 7 | 17 | CpTiNP(tBu)$_3$Me$_2$ | 4.63 | 4.63 | 88.9 | 200 | 0.00 | 4.1 | 2.0 |
|  | 18 | CpTiNP(tBu)$_3$Me$_2$ | 13.89 | 13.89 | 89.7 | 200 | 0.63 | 4.6 | 4.0 |
|  | 19 | CpTiNP(tBu)$_3$Me$_2$ | 55.56 | 55.56 | 95.4 | 200 | 0.63 | 4.2 | 4.0 |
|  | 20 | CpTiNP(tBu)$_3$Me$_2$ | 55.56 | 55.56 | 88.9 | 200 | 0.63 | 11.4 | 8.0 |
|  | 21 | CpTiNP(tBu)$_3$Me$_2$ | 55.56 | 55.56 | 87.6 | 200 | 0.63 | 12.3 | 16.0 |
| Example 8 | 22 | CptiNP(tBu)$_3$Cl$_2$ | 9.26 | 9.26 | 89.0 | 180 | 1.21 | 2.9 | 5.0 |
|  | 23 | CptiNP(tBu)$_3$Cl$_2$ | 9.26 | 9.26 | 89.2 | 180 | 0.73 | 2.7 | 5.0 |
|  | 24 | CpTiNP(tBu)$_3$Cl$_2$ | 9.26 | 9.26 | 89.5 | 180 | 0.24 | 2.6 | 5.0 |
|  | 25 | CpTiNP(tBu)$_3$Cl$_2$ | 9.26 | 9.26 | 89.8 | 180 | 0.00 | 2.9 | 5.0 |
|  | 26 | CpTiNP(tBu)$_3$Cl$_2$ | 2.55 | 2.55 | 87.7 | 180 | 0.73 | 4.3 | 16.0 |
|  | 27 | CpTiNP(tBu)$_3$Cl$_2$ | 2.55 | 2.55 | 88.8 | 180 | 0.73 | 5.1 | 12.0 |
|  | 28 | CpTiNP(tBu)$_3$Cl$_2$ | 2.55 | 2.55 | 87.8 | 180 | 0.73 | 6.3 | 8.0 |
|  | 29 | CpTiNP(tBu)$_3$Cl$_2$ | 4.63 | 4.63 | 90.8 | 180 | 0.73 | 2.6 | 4.5 |
| Example 9 | 30 | CpTiNP(tBu)$_3$Me$_2$ | 10.19 | 40.74 | 86.9 | 200 | 0.63 | 4.0 | 10.2 |
|  | 31 | CpTiNP(tBu)$_3$Me$_2$ | 10.19 | 40.74 | 87.4 | 200 | 0.63 | 4.2 | 40.0 |
| Example 10 | 32 | CpTiNP(tBu)$_3$Cl$_2$ | 27.78 | 27.78 | 88.1 | 200 | 0.65 | 5.9 | 20.0 |
| Example 11-c | 33 | CpTiNP(tBu)$_3$Cl$_2$ | 1.74 | 1.74 | 88.6 | 200 | 0.63 | 1.9 | 7.5 |
|  | 34 | CpTiNP(tBu)$_3$Cl$_2$ | 2.32 | 2.31 | 89.7 | 200 | 0.65 | 1.9 | 8.0 |
| Example 12 | 35 | CpTiNP(tBu)$_3$Cl$_2$ | 2.31 | 2.78 | 91.3 | 180 | 1.70 | 2.6 | 8.0 |
|  | 36 | CpTiNP(tBu)$_3$Cl$_2$ | 2.31 | 2.78 | 91.9 | 180 | 1.21 | 2.6 | 8.0 |
|  | 37 | CpTiNP(tBu)$_3$Cl$_2$ | 1.92 | 2.31 | 91.9 | 180 | 0.73 | 2.7 | 8.0 |
|  | 38 | CpTiNP(tBu)$_3$Cl$_2$ | 1.92 | 2.31 | 91.7 | 180 | 0.48 | 2.9 | 8.0 |
|  | 39 | CpTiNP(tBu)$_3$Cl$_2$ | 1.53 | 1.85 | 90.8 | 180 | 0.24 | 3.1 | 8.0 |
|  | 40 | CptiNP(tBu)$_3$Cl$_2$ | 1.53 | 1.85 | 90.5 | 180 | 0.12 | 3.0 | 8.0 |
|  | 41 | CpTiNP(tBu)$_3$Cl$_2$ | 1.53 | 1.85 | 90.5 | 180 | 0.00 | 2.9 | 8.0 |
|  | 42 | CpTiNP(tBu)$_3$Cl$_2$ | 6.94 | 8.33 | 93.4 | 180 | 0.24 | 3.0 | 8.0 |
|  | 43 | CpTiNP(tBu)$_3$Cl$_2$ | 3.31 | 3.96 | 90.2 | 180 | 0.24 | 3.0 | 8.0 |
|  | 44 | CpTiNP(tBu)$_3$Cl$_2$ | 2.31 | 2.78 | 87.6 | 180 | 0.24 | 2.9 | 8.0 |
|  | 45 | CpTiNP(tBu)$_3$Cl$_2$ | 8.26 | 9.91 | 93.5 | 180 | 0.73 | 2.4 | 8.0 |
|  | 46 | CpTiNP(tBu)$_3$Cl$_2$ | 5.30 | 6.37 | 91.6 | 180 | 0.73 | 2.6 | 8.0 |
|  | 47 | CpTiNP(tBu)$_3$Cl$_2$ | 3.31 | 3.96 | 89.2 | 180 | 0.73 | 2.7 | 8.0 |
|  | 48 | CpTiNP(tBu)$_3$Cl$_2$ | 2.48 | 2.96 | 86.3 | 180 | 0.73 | 2.8 | 8.0 |
|  | 49 | CpTiNP(tBu)$_3$Cl$_2$ | 2.13 | 2.55 | 85.4 | 180 | 0.24 | 3.2 | 8.0 |
|  | 50 | CpTiNP(tBu)$_3$Cl$_2$ | 1.85 | 1.85 | 88.5 | 180 | 0.65 | 1.9 | 2.5 |
|  | 51 | CpTiNP(tBu)$_3$Cl$_2$ | 1.85 | 1.85 | 89.9 | 180 | 0.65 | 2.1 | 4.0 |

Note: wt/wt = weight ratio of octene (if any) to ethylene.

What is claimed is:

1. A process for preparing thermoplastic ethylene alpha olefin copolymer having a molecular weight distribution, Mw/Mn, of greater than 2.0, said process comprising polymerizing ethylene and at least one other $C_{3\ to\ 10}$ alpha olefin under medium pressure solution polymerization conditions at a temperature of greater than 170° C. and less than 300° C. in a single polymerization reactor in the presence of a catalyst system comprising:

a phosphinimine catalyst defined by the formula:

$$(Cp)_a M(Pl)_b (L)_c$$

wherein Pl is a phosphinimine ligand; Cp is selected from the group consisting of unsubstituted cyclopentadienyl, substituted cyclopentadienyl, unsubstituted indenyl, substituted indenyl, unsubstituted fluorenyl and substituted fluorenyl; L is selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-18}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals; M is a metal selected from Ti, Hf and Zr; and wherein a is 1; b is 1; c is 1 or 2; and a+b+c=the valence of the metal M;

2) a four coordinate boron activator; and
3) at least one trialkyl aluminum.

2. The process of claim 1 wherein said catalyst system contains an alumoxane.

3. The process of claim 1 wherein said temperature is from 180 to 250° C.

4. The process of claim 1 wherein said solution polymerization conditions are further characterized by a polymerization pressure of from 10,000 to 40,000 kPa.

5. The process of claim 1 wherein said at least one $C_{3-10}$ alpha olefin comprises octene.

6. The process of claim 1 wherein said trialkylaluminum is trimethyl aluminum.

7. The process of claim 1 wherein said boron activator is a salt of tetrakis (pentaflurophenyl) borate.

8. The process of claim 6 wherein said boron activator is a trityl borate.

9. The process of claim 2 wherein said alumoxane is methylalumoxane.

* * * * *